Jan. 1, 1952     O. P. HAWTHORNE     2,580,912
TACKLE HOLDER FOR FISHERMEN
Filed May 16, 1949                                         2 SHEETS—SHEET 1

INVENTOR.
Ollie Paul Hawthorne
BY
ATTORNEY

Jan. 1, 1952     O. P. HAWTHORNE     2,580,912
TACKLE HOLDER FOR FISHERMEN
Filed May 16, 1949     2 SHEETS—SHEET 2
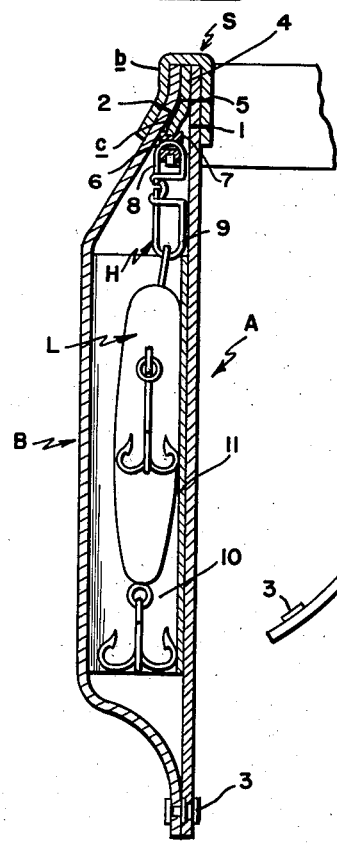
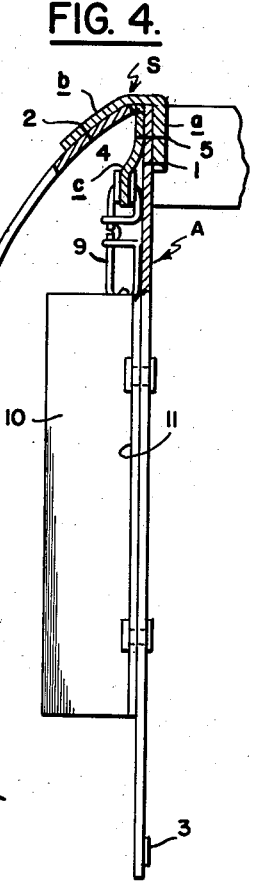
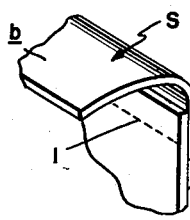
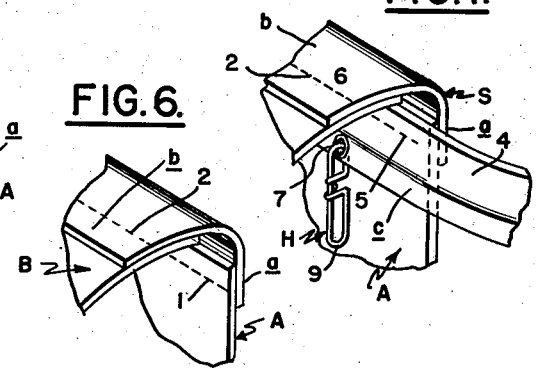
INVENTOR.
Ollie Paul Hawthorne
BY
ATTORNEY Patented Jan. 1, 1952

2,580,912

UNITED STATES PATENT OFFICE 2,580,912

TACKLE HOLDER FOR FISHERMEN

Ollie P. Hawthorne, Pampa, Tex.

Application May 16, 1949, Serial No. 93,595

4 Claims. (Cl. 224—5)

This invention relates to a tackle holder for fishermen and it is primarily an object of the invention to provide a device of this kind to be worn by the person and wherein the structure is such as to allow quick access to the inside of the device.

It is also an object of the invention to provide a device of this kind which is especially intended for use in connection with fish lures and other artificial bait and wherein the bait placed therein is concealed in a manner to prevent injury thereto or entanglement thereof.

The invention consists in the details of construction and in the combination and arrangement of the several parts of my improved tackle holder for fishermen whereby certain advantages are attained, as will be hereinafter more fully set forth.

In order that my invention may be better understood, I will now proceed to describe the same with reference to the accompanying drawings, wherein:

Figure 3 is an enlarged sectional view through the device substantially on the line 3—3 of Figure 1;

Figure 4 is a view similar to Figure 3 with the outer apron or flap in an open adjustment;

Figure 5 is a fragmentary view in perspective illustrating an initial assembly of the back apron or flap and the top or hinge strip;

Figure 6 is a view similar to Figure 5 but showing the further step of connecting the front apron or flap to the top or hinge strip; and Figure 7 is a view similar to Figure 5 but illustrating the application of the waist encircling member or belt.

Figure 1:
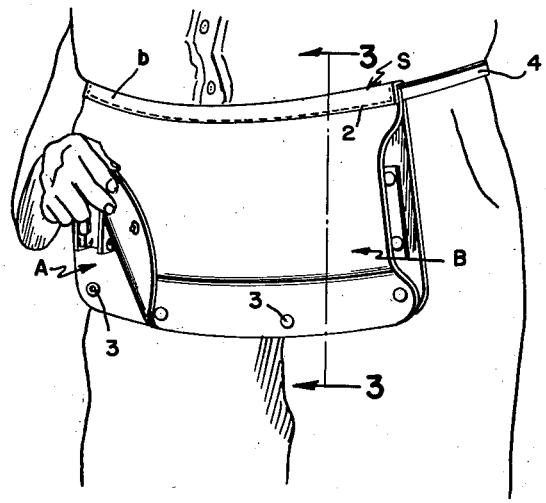
Figure 1 is a view in perspective of a holder constructed in accordance with an embodiment of the invention and in applied position upon a person, a corner portion of the outer apron or flap being turned back.
Figure 2:
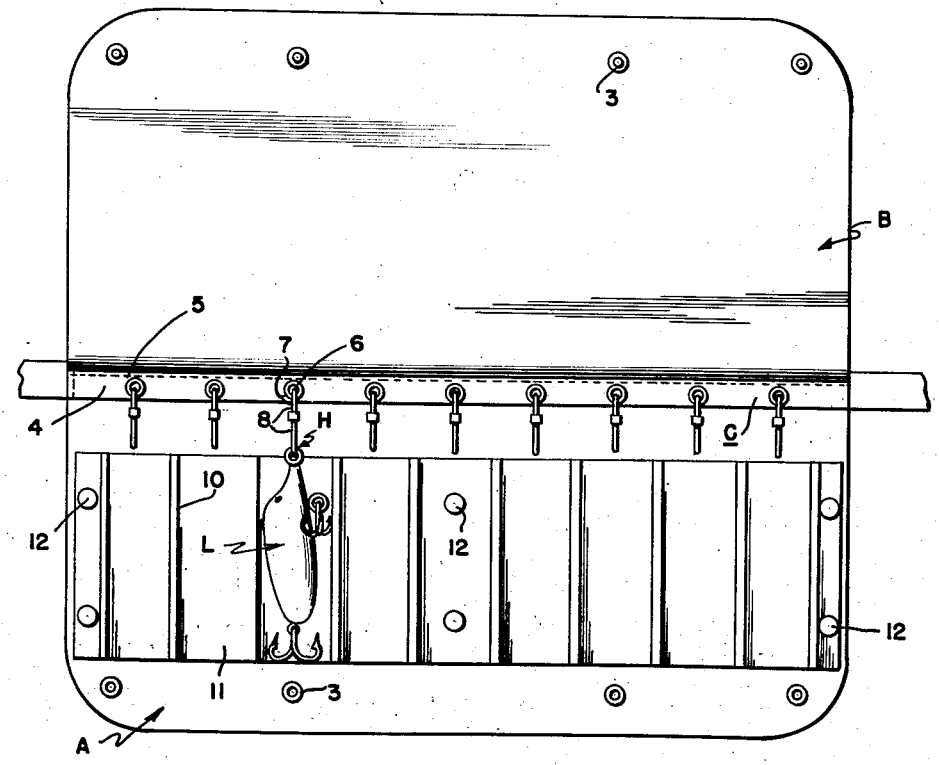
Figure 2 is an elevational view with the outer apron or flap fully raised and the waist encircling member in fragment.

In the embodiment of the invention as illustrated in the accompanying drawing, A denotes a rear apron or flap of desired dimensions and configuration and B a front apron or flap closely approaching the design and dimensions of the apron or flap A. Both of these aprons or flaps A and B are preferably produced from a suitable plastic possessing required strength and flexibility.

The upper margins of the aprons or flaps A and B are substantially straight from end to end when said aprons or flaps are flattened out. Overlying the rear face of the apron or flap A and extending entirely therealong is a marginal portion of a top or hinge strip S preferably of a textile material such as canvas. This marginal portion $a$ of the strip S along its free longitudinal margin is secured to the apron or flap A by a row 1 of stitching or otherwise as may be preferred.

The strip S at all points therealong is of a width to allow the outer marginal portion $b$ thereof to overlie the upper portion of the front apron or flap B with the outer marginal part of the portion $b$ secured to the apron or flap B by a row 2 of stitching or otherwise as desired. The width of the strip S and the locations of the rows 1 and 2 of stitching are such as to maintain the upper marginal portions of the aprons or flaps A and B in close relation but allow sufficient flexure of the strip S to permit front flap or apron B to be easily and readily swung into open or closed position with respect to the rear apron or flap A.

The outer marginal portions of the aprons or flaps A and B are provided at desired points therealong with the separable fastener elements 3 herein disclosed as conventional snaps and sockets whereby the aprons or flaps A and B may be held in closed relation and also permitting release of the front apron or flap B when desired by a pull thereon by the person.

Overlying the front or outer face of the apron or flap A and extending across the top marginal portion thereof is the intermediate part of a waist encircling member or belt 4. This member or belt 4 has its upper marginal portion secured to the apron or flap A and the portion $a$ of the strip S by a row 5 of stitching or otherwise. This attachment of the member or belt 4 allows the lower portion $c$ to be free of the adjacent portion of the apron or flap A and at points spaced therealong this free portion $c$ is provided with the openings 6 resulting from the application of the grommets 7.

Releasably engaged through each of the openings 6 is the attaching end portion 8 of a hook member H. The applied hook H depends from the member or belt 4 and the lower portion 9 has releasable engagement with a lure L or the like.

Each of the openings 6 is substantially midway between two adjacent flanges 10 extending outwardly from the apron or flap A a distance in excess of the major diameter of the lure L received therebetween and of a length in excess of such lure L.

These flanges 10, in the present embodiment of the invention, are of plastic and extend directly from a sheet or plate 11, also of plastic.

This sheet 11 extends substantially from one end to the other of the apron or flap A and is held thereto by the suitably placed rivets 12 or otherwise as may meet the requirements of practice. The flanges 10 are also substantially at right angles to the upper margin of the apron or flap A.

In use, after the device has been applied to the person, the free end portions of the belt 4 are detachably connected in any manner preferred.

From the foregoing description it is thought to be obvious that a tackle holder for fishermen constructed in accordance with my invention is particularly well adapted for use by reason of the convenience and facility with which it may be assembled and operated.

I claim:

1. A fisherman's lure holder comprising two apron bodies lying one over the other and having two of their edges parallel, said edges forming the top of the holder, said bodies being of a relatively stiff but flexible material, a hinge strip of material overlying said edges and secured to each of said bodies, said hinge strip having greater flexibility than the material of the bodies, a waist band having a portion intermediate its ends disposed across one of the bodies along the said top edge thereof, said band having a top edge secured to the said one body and a bottom edge which is free of connection with the bodies, a plurality of suspension elements attached to the free bottom edge portion of the band, and means for detachably coupling the bodies at their bottom edges.

2. A lure holder of the character stated in claim 1 with a plurality of spaced parallel flanges of rigid material disposed vertically of and projecting forwardly from the surface of the said one body over which the other body lies, the said suspension elements being located each in a position to extend along a line passing between two adjacent flanges.

3. A fisherman's lure holder of the character stated in claim 1, wherein the said apron bodies are formed of plastic and said hinge strip comprises woven fabric.

4. A fisherman's lure holder of the character stated in claim 1, with a sheet of stiff material disposed across the surface of the said one body over which the other body lies, said sheet of material being of a width materially less than the width of the said one body between its top and bottom edges, means securing said sheet of material to the said one body, and a plurality of spaced parallel flanges formed integrally with and of the same material as the said sheet of material and projecting forwardly therefrom to be covered by the said other body, said flanges having their lengths perpendicular to the top and bottom edges of the bodies, and said suspension elements each being positioned to extend downwardly along lines passing between two adjacent flanges.

OLLIE P. HAWTHORNE.

REFERENCES CITED

The following references are of record in the file of this patent:

UNITED STATES PATENTS

| Number | Name | Date |
|---|---|---|
| 415,837 | Frisbee | Nov. 26, 1889 |
| 1,621,831 | Colvin | Mar. 22, 1927 |
| 1,966,937 | Segal | July 17, 1934 |
| 2,315,095 | Rhodes | Mar. 30, 1943 |